United States Patent

[11] 3,590,651

[72] Inventor Ulric Vallieres
 Quebec, Canada
[21] Appl. No. 822,508
[22] Filed May 7, 1969
[45] Patented July 6, 1971
[73] Assignee St. Lawrence Manufacturing Company
 Giffard, Quebec, Canada

[54] REVERSIBLE TRANSMISSION
 10 Claims, 7 Drawing Figs.
[52] U.S. Cl. .................................................. 74/404
[51] Int. Cl. .................................................. F16h 57/02
[50] Field of Search ............................................ 74/404, 405

[56] References Cited
 UNITED STATES PATENTS
 903,739 11/1908 Lesemann .................... 74/404
 2,992,566 7/1961 Walker ........................ 74/355

Primary Examiner—Leonard H. Gerin
Attorney—Wolf, Greenfield & Sacks

ABSTRACT: A reversible transmission assembly for power transmission in which drive means and driven means are selectively interengaged by a gear train having three gears, with one operatively secured to the drive means, another to the driven means and the third selectively interengageable with either of the first two for turning the driven means in selected directions. The driven gear is mounted for axial movement away from the first gear means to a disengaging relation with the gear train. A clutch has one clutch half operatively secured to the second gear and the other clutch half operatively driven by the drive means with these two clutch halves adapted to interengage when the driven gear is disengaged from the gear train to drive the driven means in a direction opposite to that direction in which it's driven when the three gears are interengaged. A simple gear shifter is provided.

INVENTOR
Ulric Vallières

BY
Wolf, Greenfield & Hieken

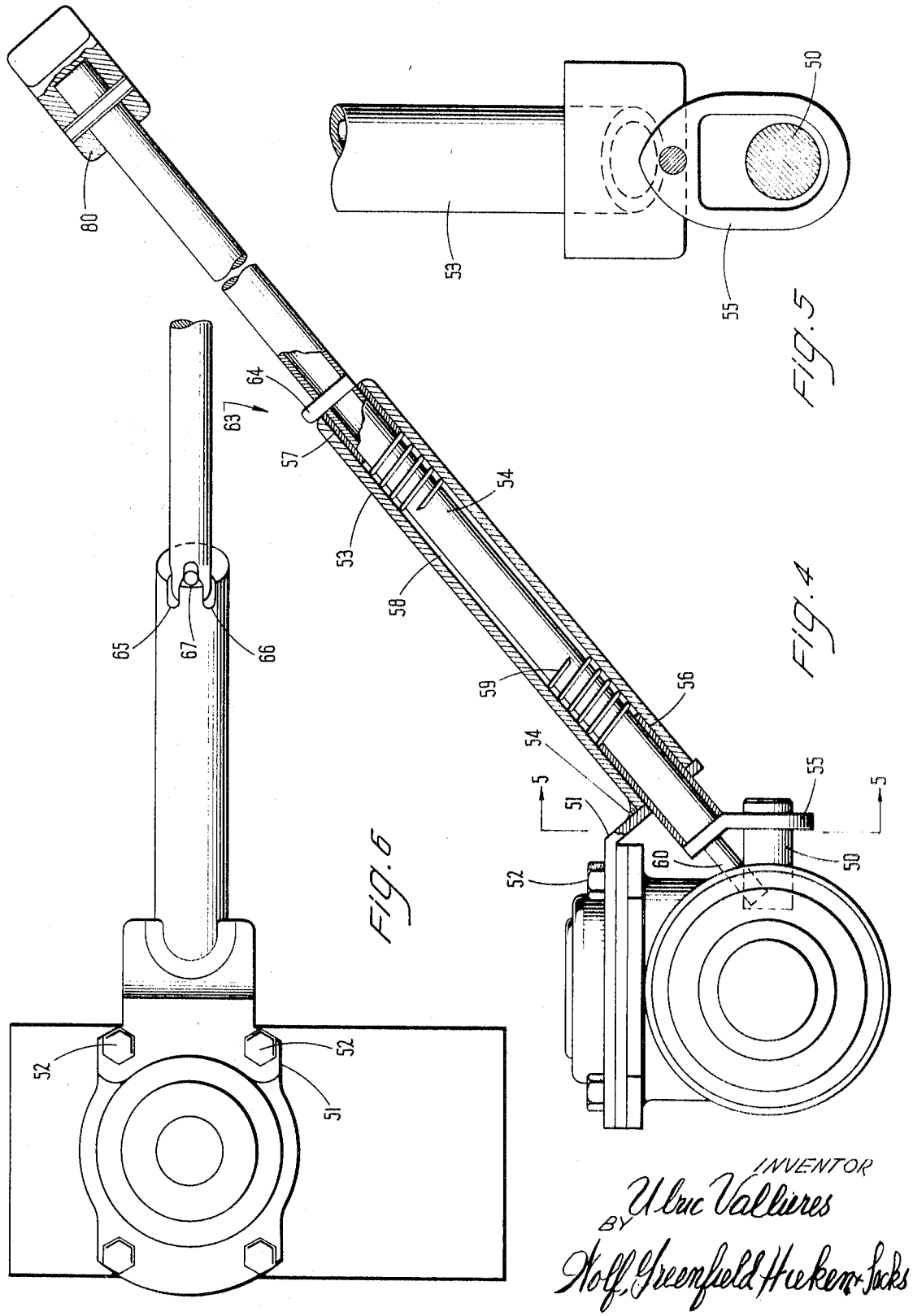

3,590,651

REVERSIBLE TRANSMISSION

SUBJECT MATTER OF THE INVENTION

The present invention relates to transmission assembly for reversible power transmission and is particularly adapted for use in connection with selective forward and reverse drive of a mechanism from a rotating power driven shaft.

BACKGROUND OF THE INVENTION

The wide variety of gear assemblies and transmissions adapted to selectively drive a driven mechanism in forward and reverse directions have a wide range of sizes and styles and operate a wide variety of devices. There is a continuing need, however, for a reversible transmission assembly that is compact, simple in design and rugged in construction that may be used in a variety of applications. And in particular there is such a need for a transmission which may be used on small vehicles and transportation devices such as snowmobiles.

SUMMARY OF THE INVENTION

The present invention is designed to attain the foregoing objects and advantages. In addition the present invention is primarily designed for use in connection with a small and simple vehicle and transportating means. In particular the present invention is designed primarily for use in small, simple transport means in which small horse-power motors must be geared to a driven mechanism in a simple and comparatively inexpensive but yet rugged fashion.

It is therefore an object of the present invention to provide a simple transmission means which can be easily assembled as a subassembly and adapted for use in a wide variety of vehicles and transporting mechanisms. A further object of the present invention is to provide an improved gear assembly for reversible power transmission in snowmobiles and like objects in which a standard and uniform assembly may be adapted for a variety of different vehicles.

In the present invention there is provided a transmission assembly for reversible power transmission from a drive means to a driven means. In this arrangement a gear train having three gears is arranged with one gear secured to the drive means, a second gear to the driven means and a third gear adapted to be selectively interengaged with or disengaged from the first and second gears when the driven and drive means are moved between a first and second relative position. A clutch means having a pair of interengageable clutch halves is secured with one clutch half operatively secured to the drive means and the other half to the driven means whereby operative engagement of the two gears will cause the driven means to move in a direction opposite to the direction of the driven means when the three gears are interengaged. The clutch halves are interengaged when the gears are disengaged and the gears are engaged when the clutch halves are disengaged. An elongated gear shift is provided for positive locking of the gears in forward or reverse position.

BRIEF DESCRIPTION OF DRAWINGS

These and other objects and advantages of the present invention will be more clearly understood when considered in conjunction with the accompanying drawings in which:

FIG. 4 is a partially cross-sectioned elevation of the transmission illustrating the gearshifting mechanism;

FIG. 5 is a cross-sectional detail taken substantially along the line 55 of FIG. 4;

FIG. 6 is a top plan fragmentary view of the transmission illustrating the gearshifting mechanism.

DETAILED DESCRIPTION OF THE PREFERRED EMBODIMENTS

Figure 1:
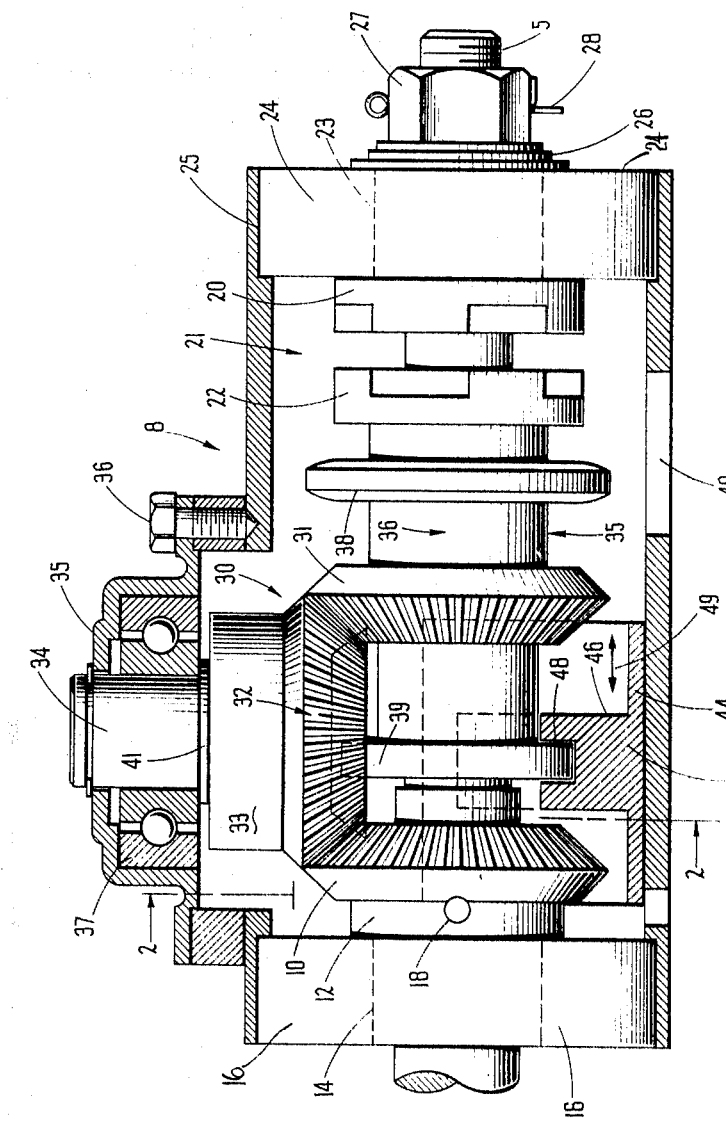
FIG. 1 is a longitudinal cross-sectional elevation of a transmission assembly embodying the present invention.
Figure 3:
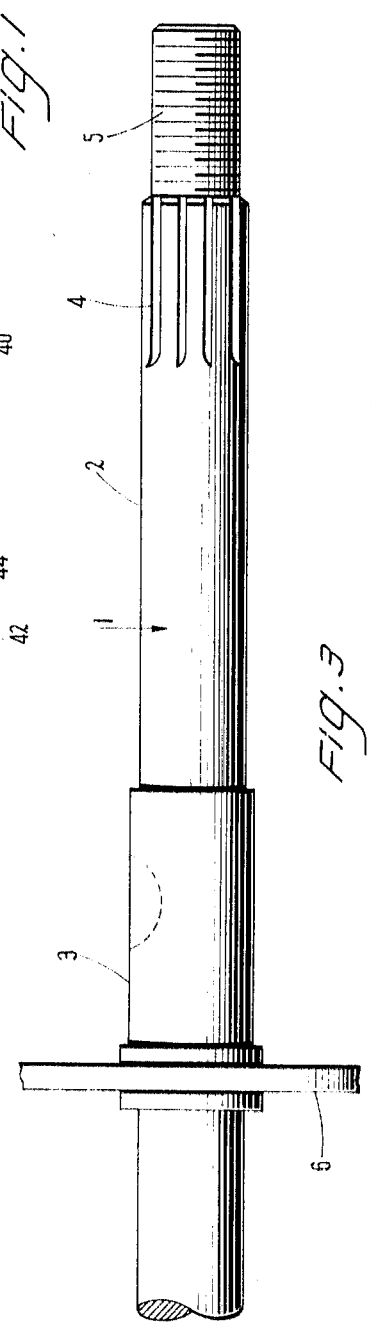
FIG. 3 is a longitudinal view of a component of the present invention.

Referring to the drawings there is illustrated an embodiment of the present invention which is used primarily in conjunction with a power transmission for a snowmobile or like vehicle in which a small motor comprising preferably a one or many cylinders combustion engine is used to drive treads of the snowmobile. In this arrangement the engine shaft is suitably coupled to the drive shaft of the power transmission device illustrated and the threads of the snowmobile or other like vehicle are suitably driven through a chain and sprocket arrangement or other suitable means from the driven shaft or driven means of the power transmission device illustrated. The driving shaft illustrated in FIG. 3 of this embodiment is formed with a center section 2, enlarged end 3 and the other end having a splined section 4 which terminates in a threaded end 5. The enlarged end 3 projects from the left end of the transmission assembly as illustrated in FIG. 1 and may have secured to it a circular flange 6 that may be riveted or otherwise secured to a pulley or other means adapted to receive rotational power from the motor or other drive sources. This drive shaft 1, may for example, be driven normally by the motor or drive source in a counterclockwise direction. The shaft 1 is supported within the housing 8 which comprises an elongated substantially cylindrical member having suitable apertures and supporting means hereafter described. As illustrated in FIG. 1, first bevel or miter gear 10 is supported coaxially on the shaft 1 preferably at its left end. This gear 10 has an annular collar 12 through which shaft 1 extends with the enlarged end 3 partially colinear with this collar. A reduced portion 14 of the collar 12 which is also colinear with the enlarged portion 3 of shaft 1 is supported for rotation in the roller bearing 16 which in turn is suitably supported preferably at the left end of the housing 8, as illustrated in FIG. 1. The gear 10 is keyed to the shaft 1 in the enlarged end 3 by suitable means including, for example, a suitable lock screw spring pin and key 18 which extends through the collar into engagement with the shaft 1. The other end of the shaft 1 supports a clutch half 20 which is one-half of the clutch assembly 21, the other half of the clutch assembly 21 comprising a facing clutch half 22. The clutch half 20 is preferably formed with a annular collar 23 which is internally splined to operatively interengage and rotationally key with the splined section 4 of the shaft 1. The outer surface of collar 23 is supported in the roller bearing 24 in turn supported and secured in a shoulder in the housing 8. The bearing 24 is suitably secured in the shoulder section 25 by lockwashers 26 and locknut 27 which may be suitably locked by a cotter pin 28 extending through a hole in the threaded end 5 of the shaft 1. Thus, clutch half 20 is also adapted to rotate with shaft 1 in a counterclockwise direction.

The gear 10 forms one of three gears in the gear train generally illustrated at 30. A second gear 31 is supported in aligned facing relation with gear 10 and is adapted to be operatively interengaged with the first gear 10 by the third gear 32 of the gear train. Third gear 32 is preferably a bevel or miter gear having a collar 33 which is keyed to a shaft 34 in turn supported by bearing 37 and washer 41 on an axis normal to the axis of shaft 1 by a support 35 which is suitably secured by bolts 36 over an opening in the housing 8. The gear 32 is adapted to be permanently engaged with gear 10 for rotation in response to movement of gear 10 in a clockwise direction. Gear 31 may be selectively interengaged or disengaged with gear 32 by means hereafter described. When engaged with gear 32 gear 31 will rotate in a direction opposite to the direction of rotation of gear 10. Gear 31 which is the second gear of the gear train is mounted on a slidable support means 35. This support means 35 comprises a loose-fitting collar or sleeve 36 coaxial with shaft 1 and adapted to slide over a limited distance of its center section 2. The sleeve 36 has the gear 31 coaxially and securely interengaged at one end and a clutch half 22 securely and coaxially interengaged at the other end. In addition a sprocket 38 is coaxially supported on the sleeve 36 intermediate the gear 31 and clutch half 22. A flange 39 is secured and extends radially outward from the sleeve 36 at the end of the sleeve remote from clutch half 22. This flange 39 is positioned intermediate the two gears 31 and 10 and is adapted to slide axially with the collar 36 in respect to the shaft 1. The sprocket 38 is adapted to support and drive a conventional chain which is looped about the sprocket 38 through an opening 40 in the housing. The other end of the chain may be suitably connected to another sprocket in turn connected to the drive shafts or wheels of the snowmobile tread or other like vehicle. Thus, sleeve 36 supports an integral assembly which comprises the flange 39, gear 31, sprocket 38 and clutch half 22 with these last-mentioned components adapted to move as an integral unit in a direction longitudinal of the shaft 1 from a position in which gear 31 engages gear 32 to a position in which gear 31 is disengaged from gear 32 and clutch half 22 is interengaged with clutch half 20.

Figure 2:
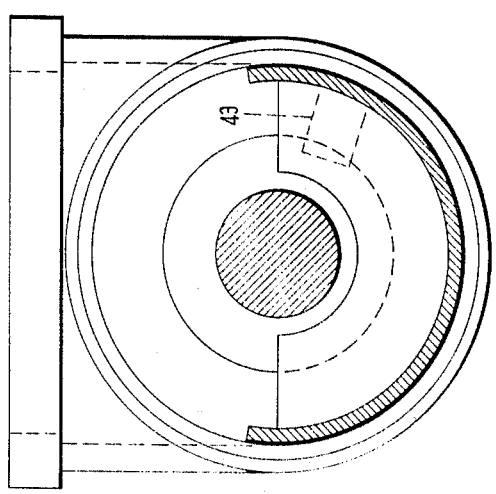
FIG. 2 is a cross-sectional elevation taken substantially along the line 22 of FIG. 1.

A shifter 42 is used to move the assembly supported on the collar 36 between the two positions described. This shifter best illustrated in FIGS. 1 and 2 is supported within the housing 8 for longitudinal movement over a limited distance. The shifter is provided with an arcuate wall 44, the outer surface of which engages the inner surface of the housing 8. Extending radially inwardly from this wall 44 is an arcuate flange 46. A channel 48 in this flange 46 is dimensioned to receive and engage opposite sides of the flange 39. Movement of the shifter to either the left or the right as viewed in FIG. 1, will cause a corresponding movement of the flange 39 which in turn causes a consequent movement of the collar 36 and components supported on it.

Means are provided for moving the shifter 42 in the directions indicated by the arrow 49 between a forward and reverse position. These means are best illustrated in FIGS. 2 and 4—6. In this arrangement the shifter 42 is provided with three holes 43 longitudinally aligned and spaced apart in an actual embodiment a distance from center to center of seven-sixteenths inch. These two holes are adapted to receive a locking mechanism hereafter described and are designed to be selectively aligned with one end of a locking mechanism. Also projecting from the arcuate sleeve 42 is a boss 50 that extends through a slot in the housing 40. The slot should be of sufficient length to permit longitudinal movement of the boss 50 with respect to the axis of the shifter, a distance of at least seven-sixteenths inch. A bracket 51 is suitably bolted to the housing by screws 52. This bracket 51 supports a tubular sleeve 53 which is welded to the bracket. A control shaft 54 extends through the tubular member 53 at either end. The lower end of the shaft 54 secures a toggle arm 55 which has an opening that loosely engages the boss 50. Rotation of the shaft 54 causes rotational movement of the toggle arm 55 and consequent lateral shifting of the boss 50. A pair of bushings 56 and 57 are positioned respectively at the lower end and the upper end of the tubular sleeve 53 and define a space 58 between the inner wall of the sleeve 53 and the shaft 54 within which a spring 59 is positioned. Bushing 57 is welded or otherwise suitably secured to the inner surface of sleeve 53 while bushing 56 is secured to shaft 54. The spring 59 normally tensions the shaft 54 downwardly towards the transmission. Thus, pin 60 at the lower end of the shaft 54 is normally urged into engagement with one of the three holes 43 depending upon which one is aligned with the lower end of the shaft 54, thus providing a locking means.

Suitable means may be provided for indicating whether the machine is in forward, reverse, or neutral. This means may be provided at 63 and includes a pin 64 projecting radially from the shaft 54 which is adapted to selectively engage one of the slots 65 or 66 for a forward or reverse position, or alternately a center position 67 for neutral.

A handle of suitable shape and size is provided at 80 with the handle adapted to permit axial movement and rotational movement of the shaft 54.

In the operation of this transmission assembly the sprocket 38 will rotate in the direction opposite to the direction of rotation of the gear 10 and shaft 1 when the assembly is in the position illustrated in FIG. 1. However when the shifter 42 is moved to the right, the gear 31 disengages from gear 32 and clutch halves 20 and 22 are interengaged. Under these circumstances gear 31 is no longer causing the sprocket 38 to rotate in a direction opposite to gear 10 because gear 31 is now disengaged. However the clutch halves 20 and 22 are interengaged and since clutch half 20 is driven in the same direction as shaft 1 by splines 4 and gear 10 the clutch half 22 will thus cause the sprocket 38 to rotate in the same direction as the shaft 1 and gear 10 when these two clutch halves are interengaged. Thus an operator may cause reversal of movement of the sprocket 38 by simply shifting the shifter 42 from one to the second position.

Figure 7:
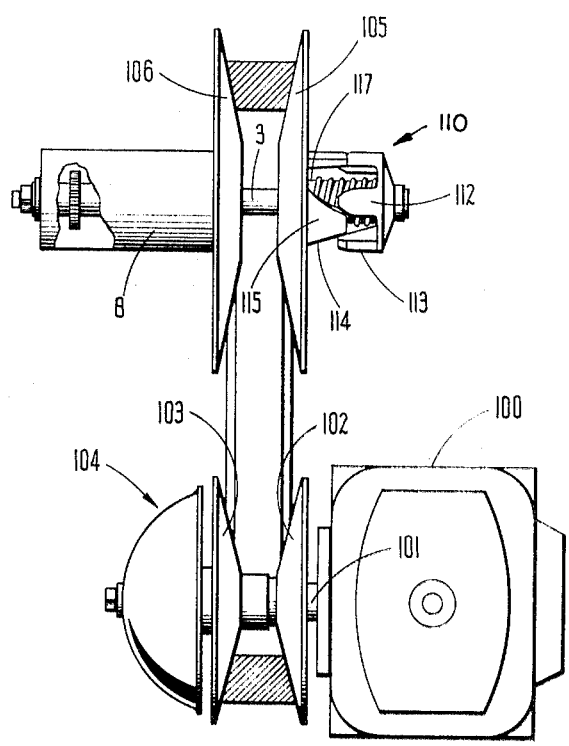
FIG. 7 is a plan view of a typical system using the present invention.

Referring now to FIG. 7, there is shown a typical arrangement wherein a transmission assembly is used for a snowmobile or the like. In this arrangement, the power source as for example a motor 100 has its shaft 101 supporting the adjustable pulley sheaves 102 and 103 of torque converter 104. A V-drive belt encircles the shaft 101 supporting the sheaves 102 and 103 and the sheaves 105 and 106. Sheave 106, in this arrangement, is bolted or otherwise firmly secured to flange 6 of shaft 1 (see FIG. 3). This flange 6 is very close to one end of the housing 8. The other sheave 105 is supported on a cam assembly 110 coaxial with and supported on end 3 of shaft 1. The cam assembly has a fixed part 112 with bearing surfaces 113 with the part 115 fixed to sheave 105 and has bearing surfaces 114. The parts are normally tensioned apart by spring 117. At increased speeds, they move apart against the tension of spring 117 to accommodate radial movements of the belt between sheaves 105 and 106.

The embodiments of the invention in which I claim an exclusive property or privilege, are defined as follows:

1. A transmission assembly for reversible power transmission comprising drive means and driven means,
    a gear train comprising three gears,
    means operatively securing one gear to said drive means and a second to said driven means,
    means supporting said drive and driven means for movement between first and second relative positions with said third gear operatively interengaging said first and second gears in said first position and said first gear operatively disengaged from said second gear in said second position,
    a clutch having a pair of interengageable clutch halves, means operatively securing one clutch half to said drive means and the other clutch half to said driven means for operative interengagement when said gears are in said second position whereby said driven means is moved in a direction opposite to the direction of movement when said gears are engaged and disengagement when said gears are in said first position,
    wherein said drive means includes a shaft and said means operatively securing said gears include means for supporting said first and second gears for rotation on an axis coincident with the axis of said shaft,
    said means operatively securing said clutch halves including means supporting said clutch halves for rotation about an axis coincident with the axis of said shaft,
    said driven means including a sleeve coaxial with said shaft and having said second gear facing in one axial direction and said other clutch half facing in the other axial direction,
    means supporting said third gear on an axis normal to the axis of said shaft with said gears comprising pinion gears,
    said first gear and said one clutch half having operating surfaces facing in axial directions of said shaft toward one another,
    a sprocket and means securing said sprocket to said sleeve for rotation therewith,
    a housing and bearing means supporting said shaft within said housing with said first and second gears supported for rotation with said housing coaxial with respect to said shaft, means facing an aperture in said housing through which a chain engaged by said sprocket passes, said sleeve including a flange extending radially therefrom, a shift mechanism including an arcuate sleeve longitudinally slidable within said housing, an an arcuate flange with a channel therein normal to said arcuate sleeve and engaging said radially extending flange for movement thereof in directions longitudinal of said shaft.

2. A transmission as set forth in claim 1 wherein said flange is positioned intermediate said first and second gears.

3. A transmission as set forth in claim 1 wherein said sprocket third gear and engaging clutch half is a single piece.

4. A transmission assembly for reversible power transmission comprising drive means and driven means, a gear train comprising three gears, means operatively securing one gear to said drive means and a second to said driven means, means supporting said drive and driven means for movement between first and second relative positions with said third gear operatively interengaging said first and second gears in said first position and said first gear operatively disengaged from said second gear in said second position, a clutch having a pair of interengagable clutch halves, means operatively securing one clutch half to said drive means and the other clutch half to said driven means for operative interengagement when said gears are in said second position whereby said driven means is moved in a direction opposite to the direction of movement when said gears are engaged and disengagement when said gears are in said first position, said drive means including a shaft and said means operatively securing said gears including means for supporting said first and second gears for rotation on an axis coincident with the axis of said shaft, said means operatively securing said clutch halves including means supporting said clutch halves for rotation about an axis coincident with the axis of said shaft, said driven means including a sleeve coaxial with said shaft and having said second gear facing in one axial direction and said other clutch half facing in the other axial direction, said sleeve including a flange extending radially therefrom, and a shift mechanism including an arcuate sleeve, means supporting said arcuate sleeve for movement parallel to the axis of said coaxial sleeve, an arcuate flange with a channel therein normal to and integral with said arcuate sleeve and engaging said radially extending flange for movement thereof in directions parallel to said shaft, means projecting from said arcuate flange, and toggle means engageable with said projecting means for movement of said arcuate sleeve.

5. A transmission as set forth in claim 4 including means for selectively locking said arcuate sleeve in a forward, neutral or reverse position.

6. A transmission as set forth in claim 5 wherein said locking means comprises a control shaft, means supporting said control shaft for axial rotation and longitudinal movement toward and away from said arcuate sleeve, means forming three holes in said arcuate sleeve alignable respectively with one end of said control shaft when in a forward, neutral and reverse position and means tensioning said control shaft toward the aligned one of said holes whereby engagement of said one end with said aligned hole will lock said arcuate sleeve in position.

7. A transmission assembly for reversible power transmission comprising drive means and driven means, means supporting said drive and driven means for movement between first and second relative positions with said third gear operatively interengaging said first and second gears in said first position and said first gear operatively disengaged from said second gear in said second position, a clutch having a pair of interengagable clutch halves, means operatively securing one clutch half to said drive means and the other clutch half to said driven means for operative interengagement when said gears are in said second position whereby said driven means is moved in a direction opposite to the direction of movement when said gears are engaged and disengagement when said gears are in said first position, wherein said means operatively securing one gear to said drive means, and a second to said driven means includes a shaft axially extending through said gears and having a sheave axially keyed thereto, and a second sheave facing the first-mentioned sheave positioned axially thereon, and means securing said second sheave for movement longitudinally of said shaft.

8. A transmission assembly for reversible power transmission comprising drive means and driven means, a gear train comprising three gears, means operatively securing one gear to said drive means and a second to said driven means, means supporting said drive and driven means for movement between first and second relative positions with said third gear operatively interengaging said first and second gears in said first position and said first gear operatively disengaged from said second gear in said second position, a clutch having a pair of interengageable clutch halves, means operatively securing one clutch half to said drive means and the other clutch half to said driven means for operative interengagement when said gears are in said second position whereby said driven means is moved in a direction opposite to the direction of movement when said gears are engaged and disengagment when said gears are in said first position, said drive means including a shaft and said means operatively securing said gears including means for supporting said first and second gears for rotation on an axis coincident with the axis of said shaft, said means operatively securing said clutch halves including means supporting said clutch halves for rotation about an axis coincident with the axis of said shaft, said driven means including a sleeve coaxial with said shaft, said sleeve including a flange extending radially therefrom, a housing and means supporting said shaft within said housing, a shifting mechanism including an arcuate sleeve longitudinally slidable within said housing, and an arcuate flange with a channel therein normal to said arcuate sleeve and engaging said radially extending flange for movement thereof in directions longitudinal of said shaft.

9. A transmission as set forth in claim 8 wherein said flange is positioned intermediate said first and second gears.

10. In a transmission having a drive means including a shaft and a driven means including a sleeve coaxial with said shaft, having a radially extending flange and adapted to assume one of a plurality of different positions longitudinal of said shaft, a shift mechanism comprising, an arcuate sleeve, means supporting said arcuate sleeve for movement parallel to the axis of said coaxial sleeve, an arcuate flange with a channel therein normal to said arcuate sleeve and engaging said radially extending flange for movement thereof in directions longitudinal of said shaft, means projecting from said arcuate flange, and toggle means engageable with said projecting means for movement of said arcuate sleeve.